United States Patent [19]
Gamertsfelder et al.

[11] 3,787,866
[45] Jan. 22, 1974

[54] DOPPLER ANTENNA CALIBRATION APPARATUS

[75] Inventors: George R. Gamertsfelder, Pleasantville; Gus Stavis, Croton-on-Hudson; Leonard O. Vladimir, Chappaqua, all of N.Y.

[73] Assignee: The Singer Company, Little Falls, N.J.

[22] Filed: Dec. 15, 1972

[21] Appl. No.: 315,300

[52] U.S. Cl. .............................. 343/703, 343/17.7
[51] Int. Cl. ............................................ G01s 7/40
[58] Field of Search................... 343/703, 17.7, 915

[56] References Cited
UNITED STATES PATENTS 3,388,604   6/1968   McFarland et al. ........... 343/17.7 X
2,602,924   7/1952   Schmitt et al................... 343/703 X Primary Examiner—Rudolph V. Rolinec
Assistant Examiner—Marvin Nussbaum
Attorney, Agent, or Firm—T. W. Kennedy

[57] ABSTRACT

Apparatus which permits near-field calibration of a doppler antenna in the laboratory avoiding the high costs and uncertainties of flight calibration is shown. The antenna and an associated transmitter are mounted over and very close to a scattering surface and means provided to effect relative motion between the antenna and the surface. In one embodiment the scattering surface is on an endless belt which is driven under the antenna and, in another, the antenna is placed on an arm and rotated over an annular trough containing granular material.

10 Claims, 3 Drawing Figures

PATENTED JAN 22 1974 3,787,866

DOPPLER ANTENNA CALIBRATION APPARATUS

BACKGROUND OF THE INVENTION

This invention relates to antennas in general and more particularly to an apparatus for calibrating doppler antennas.

Because of slight differences in each antenna manufactured, each antenna to be used in a doppler navigation system must be individually calibrated before delivery in order to maintain the required accuracy. In the past the antenna to be calibrated was installed in an aircraft and flown over a measured course, usually several times to obtain an average calibration value. Another method of calibration was to fly over an arbitrary course and establish a reference using a second doppler system which was known to be accurate. These prior art methods of calibrations have several serious drawbacks. The first is the high cost of flight calibration. In addition, the calibration operation is dependent on weather, i.e., the weather must be good enough for flying and observation of the ground. Furthermore, this method of calibration is limited in accuracy since the true flight path will not be known precisely.

However, this has always been considered by those skilled in the art as the only practical method of calibrating antennas. It has always been thought that calibration in a near field would not prove satisfactory. As will be pointed out below, the present apparatus proves this contention to be untrue and permits accurate calibration in a simple method using the near field.

SUMMARY OF THE INVENTION

In the present invention calibration is accomplished by mounting the antenna to be calibrated over a moving belt or the like upon which are placed scattering members which will cause radiation patterns simulating those to be found in actual flight. The surface is then driven under the antenna for a known and predetermined distance. From the known distance of travel and the outputs of the doppler system, it is then possible to obtain the calibration data for the antenna.

DETAILED DESCRIPTION OF THE PREFERRED EMBODIMENT

Figure 1:
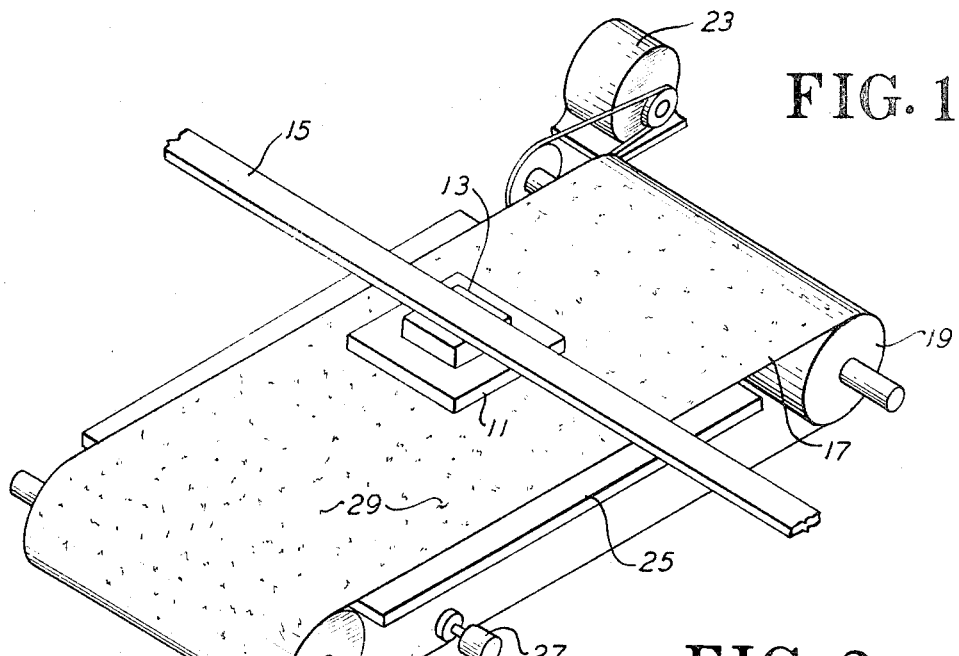
FIG. 1 is an oblique view of a first embodiment of the invention.
Figure 2:
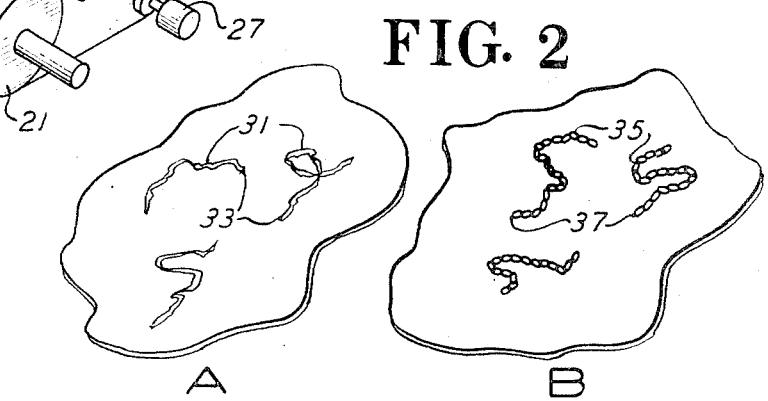
FIG. 2 is an oblique view of a section of the belt of FIG. 1 showing the scatterers.

As shown in FIG. 1, the antenna 11 to be calibrated and a transmitter receiver 13 are mounted upon a fixed support 15 over a belt 17. Belt 17 is an endless belt which is passed over a driven roller 19 and an idler roller 21 which may be mounted in suitable bearing means in conventional fashion. Roller 19 is driven by a motor 23 causing the belt to travel at a constant speed under the antenna 11. On the side of the belt 17, opposite the antenna 11, is a plate 25 to absorb radiation transmitted by the transmitter. The spacing of the antenna, with respect to the belt can be very small, for example, a distance as small as a few centimeters. A shaft encoder 27 or other similar device may be used to measure the distance traveled by the belt. Secured to the belt and capable of moving in random fashion are a multiplicity of scatterers 29. Examples of such scatterers are shown on FIG. 2. For example, the scatterers might be Christmas tree tinsel 31 as shown on FIG. 2A. Each piece of the tinsel is affixed at a point, for example, 33 to the belt. A second type of scattered comprises small pieces of chain 35 as shown on FIG. 2B. Again, these pieces of chain would be affixed to the belt at a point 37. As the belt rotates around the rollers 19 and 21, the tinsel or chains will tend to fall in random patterns and will thus provide random scattering of the radiation simulating the type of scattering normally associated with an operating system. The moving belt need not be particularly large, in fact, it may be only slightly larger than the antenna being calibrated. The calibration process does not need constant attendance. It can be set up and allowed to run for the required period and readings taken at the end thereof. Also, the distance traveled will be very accurately known from the output of encoder 27 or the like. The output of the receiver 13 may be provided to a conventional doppler system including a doppler frequency tracker. The doppler frequency tracker outputs may then be used for comparison with the actual distance traveled to obtain the calibration constants.

Figure 3:
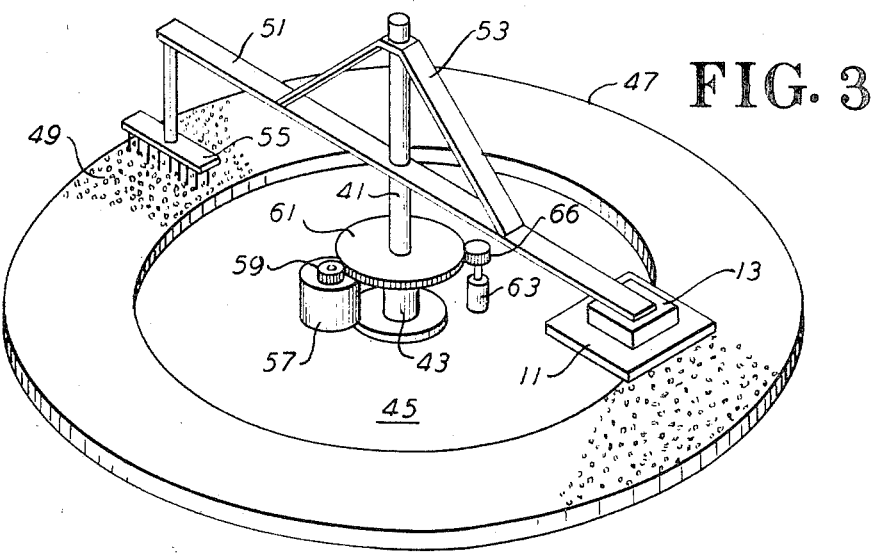
FIG. 3 is an oblique view of a second embodiment of the invention in which gravel is used as a scatterer.

It is not within the scope of this invention to describe the operation of the doppler transmitter-receiver and frequency tracker. For details on this operation see U.S. Pat. Nos. 2,856,519, 2,870,331 and 2,896,074. Although a completely conventional doppler system can be used with the present invention, various simplifications may be made to the doppler system used for testing. Because of the closeness of the antenna to the belt, the power output of the transmitter can be greatly reduced. In addition, the receiver need not be as sophisticated as that of the operational system. For example, instead of using a super heterodyne receiver, a simple crystal-type to obtain an audio beat between the transmitted and received signals may be used. A conventional frequency tracker would normally be used although the signal acquisition portions of the tracker would not be required and adjustments should be made to its time constants and filter widths to accommodate the belt speed which would be lower than the normal flying speed. Modifications of this nature will be obvious to those skilled in the doppler art. A second embodiment of the invention is shown in FIG. 3. A vertical member 41 is mounted for rotation in suitable bearing means 43 affixed to a fixed support surface 45. Also affixed to surface 45 is an annular trough 47 filled with a layer of gravel or similar granular material 49. A cross member 51 is secured to member 41 by a bracket 53 for rotation therewith. Extending from one end of cross member 51 is a rake 55 which will pass through and rearrange the gravel as cross member 51 rotates. The antenna 11 and transmitter-receiver 13 are attached to the other end of cross member 51 to radiate their energy toward the gravel in the trough. A motor 57 with a gear 59 on its shaft drives another gear 61 attached to member 41 causing it and cross member 51 to rotate thereby carrying the antenna 11 and rake 55 in a circular path. As the antenna rotates with member 51 the rake 55 will be continually rearranging the gravel to provide the desired random reflecting surface. A shaft encoder, or the like, 63 driven by a gear 65 meshed with gear 61 will provide an output indicative of the total distance traveled by antenna 11 for use in calibration.

Apparatus was constructed according to the embodiment of FIG. 1 and a number of antennas which had been previously flight calibrated tested using this apparatus and a simplified version of a frequency tracker. Despite the fact that precautions were not taken to maintain absolute accuracy in the frequency tracker, upon a test of five antennas the results on four of the antennas came out to have errors between −0.47 percent and +58 percent from that obtained in flight tests. One of the five antennas had calibration results which differed greatly from the flight calibration for some unexplained reason. These results show that the apparatus of the present invention can be very useful and accomplish great time and cost savings in the calibration of doppler antennas. It will be recognized by those skilled in the art that with improved frequency tracker equipment the results should also improve.

Thus, a simple apparatus by which a doppler antenna may be calibrated using the near field has been shown. Although specific embodiments have been shown and described, it will be obvious to those skilled in the art that various modifications may be made without departing from the spirit of the invention which is intended to be limited solely by the appended claims.

We claim:

1. Apparatus to provide movement of a doppler antenna over a surface to obtain outputs useful in calibration of the antenna comprising:
   a. a reflecting surface containing random scattering means;
   b. means to mount the antenna to be tested and its associated transmitter-receiver a small distance above said surface;
   c. means to effect relative motion between said surface and said antenna; and
   d. means providing an output indicative of one of the speed and distance traveled of said surface with respect to said antenna.

2. The invention according to claim 1 wherein said surface comprises an endless belt supported between two cylindrical rollers having mounted thereon a multiplicity of flexible reflectors, said reflectors mounted so that they are free to reorient themselves as said belt moves and said means to effect relative motion of said belt comprise means to rotate at least one of said cylindrical rollers.

3. The invention according to claim 3 wherein said reflectors are lengths of chain.

4. The invention according to claim 3 wherein said reflectors are lengths of tinsel.

5. The invention according to claim 3 wherein said means to drive said rollers comprises an electric motor.

6. The invention according to claim 1 wherein said surface comprises an annular trough containing a layer of granular reflecting material, said means to mount said antenna comprises a horizontal crossmember affixed to a rotable vertical member such that rotation will cause said antenna to pass over and annular trough in a circular path, and said means to effect relative motion comprise means to rotate said vertical member.

7. The invention according to claim 6 and further including a rake secured to the end of said crossmember opposite said antenna extending into said layer of granular material whereby said granular material will be rearranged as said crossmember rotates.

8. The invention according to claim 7 wherein said means to rotate said vertical member comprises an electrical motor coupled to said vertical member.

9. The invention according to claim 9 wherein said granular material is gravel.

10. The invention according to claim 1 wherein said output means comprise a shaft encoder coupled to said moving means.

* * * * *